(12) United States Patent
Okaniwa et al.

(10) Patent No.: US 9,057,840 B2
(45) Date of Patent: Jun. 16, 2015

(54) OPTICAL FILTER AND IMAGING DEVICE COMPRISING THE SAME

(75) Inventors: Motoki Okaniwa, Tokyo (JP); Takaaki Uno, Tokyo (JP); Shintaro Fujitomi, Tokyo (JP); Takashi Okada, Tokyo (JP); Toshihiro Otsuki, Tokyo (JP); Katsuya Nagaya, Tokyo (JP)

(73) Assignee: JSR CORPORATION, Tokyo (JP)

( * ) Notice: Subject to any disclaimer, the term of this patent is extended or adjusted under 35 U.S.C. 154(b) by 191 days.

(21) Appl. No.: 13/813,642

(22) PCT Filed: Jul. 25, 2011

(86) PCT No.: PCT/JP2011/066843
§ 371 (c)(1),
(2), (4) Date: Jan. 31, 2013

(87) PCT Pub. No.: WO2012/017848
PCT Pub. Date: Feb. 9, 2012

(65) Prior Publication Data
US 2013/0128361 A1 May 23, 2013

(30) Foreign Application Priority Data

Aug. 3, 2010 (JP) ................................. 2010-174896

(51) Int. Cl.
*G02B 5/28* (2006.01)
*G02B 5/22* (2006.01)

(52) U.S. Cl.
CPC . *G02B 5/287* (2013.01); *G02B 5/22* (2013.01)

(58) Field of Classification Search
CPC ............... G02B 5/22; G02B 5/26; G02B 5/28
USPC .......................................... 359/580, 581, 586
See application file for complete search history.

(56) References Cited

U.S. PATENT DOCUMENTS

| 6,207,728 | B1 | 3/2001 | Sekiguchi et al. |
| 7,772,356 | B2 | 8/2010 | Yamada et al. |
| 8,014,071 | B2 | 9/2011 | Matsumoto et al. |
| 2008/0165421 | A1 * | 7/2008 | Matsumoto et al. .......... 359/589 |

FOREIGN PATENT DOCUMENTS

| CN | 1912008 A | 2/2007 |
| CN | 101558335 A | 10/2009 |
| JP | 10-324747 | 12/1998 |
| JP | 2000-001648 | 1/2000 |
| JP | 2000-109560 | 4/2000 |
| JP | 2005-338395 | 12/2005 |
| JP | 2006-119383 | 5/2006 |
| JP | 2007-246629 | 9/2007 |
| JP | 2008-050512 | 3/2008 |
| JP | 2008-181121 | 8/2008 |
| JP | 2009-157273 | 7/2009 |

OTHER PUBLICATIONS

International Search Report for corresponding International Application No. PCT/JP2011/066843, Oct. 25, 2011.
Japanese Office Action for corresponding Jp Application No. 2012-527665, Nov. 13, 2012.
Combined Chinese Office Action and Search Report issued Jun. 16, 2014 in Patent Application No. 201180037953.X (with English translation of categories of cited documents).

* cited by examiner

*Primary Examiner* — Joseph P Martinez
(74) *Attorney, Agent, or Firm* — Oblon, McClelland, Maier & Neustadt, L.L.P.

(57) ABSTRACT

An optical filter comprising a substrate and a dielectric multilayer film formed on at least one surface of the substrate, wherein the substrate comprises an aromatic polyether-based polymer having a glass transition temperature (Tg), measured via differential scanning calorimetry (DSC, heating rate: 20° C./min), of from 230 to 350° C.

11 Claims, No Drawings

OPTICAL FILTER AND IMAGING DEVICE COMPRISING THE SAME

TECHNICAL FIELD

The present invention relates to an optical filter and an imaging device comprising the same.

BACKGROUND ART

Conventionally, optical filters have been used to correct luminosity factors and to prevent declines in resolution in video cameras, digital still cameras, mobile phones with camera features, and the like.

For example, in video cameras, digital still cameras, mobile phones with camera features, and the like, solid-state image sensors for color images such as CCD and CMOS image sensors are used. Luminosity factor correction must be performed because silicon photodiodes, which are sensitive to near-infrared rays, are used in the light receiving portions of these solid-state image sensors and, and thus, in many cases, near-infrared ray cutoff filters are used.

In light adjusting devices such as diaphragm devices, diaphragm and shutter devices used in the lens optical system of video cameras, digital still cameras, mobile phones with camera features, and the like, neutral density filters and similar optical filters are used to prevent declines in resolution and the like caused by hunting or diffraction phenomena.

PET (polyethylene terephthalate), PEN (polyethylene naphthalate), and norbornene-based resins are known as raw materials for the substrate of these optical filters (Patent Literature 1). However, the glass transition temperature of these resins is low, from 70 to 180° C. and, in some cases, heat resistance is not sufficient.

Additionally, Patent Literature 2 describes an infrared ray absorption filter constituted by a polycarbonate resin having a fluorene skeleton and a coloring matter having infrared ray absorption power.

CITATION LIST

Patent Literatures

Patent Literature 1: JP-A-2005-338395
Patent Literature 2: JP-A-2006-119383

SUMMARY OF INVENTION

Technical Problem

An object of the present invention is to provide an optical filter having superior light transmittance, heat resistance, heat coloration resistance, and mechanical strength.

Technical Solution

As a result of diligent research to solve the problems described above, the present inventors discovered that the problems could be solved via an optical filter comprising a substrate comprising an aromatic polyether-based polymer having a specific glass transition temperature and a dielectric multilayer film. Furthermore, the present inventors discovered that such a filter has superior heat coloration resistance. Thus, the present invention was completed.

That is, the present invention provides the following [1] to [9].

[1] An optical filter comprising a substrate and a dielectric multilayer film formed on at least one surface of the substrate, wherein the substrate comprises an aromatic polyether-based polymer having a glass transition temperature (Tg), measured via differential scanning calorimetry (DSC, heating rate: 20° C./min), of from 230 to 350° C.

[2] The optical filter described in [1], wherein the aromatic polyether-based polymer comprises at least one structural unit (i) selected from the group consisting of a structural unit represented by formula (1) below and a structural unit represented by formula (2) below.

[Chem. 1]

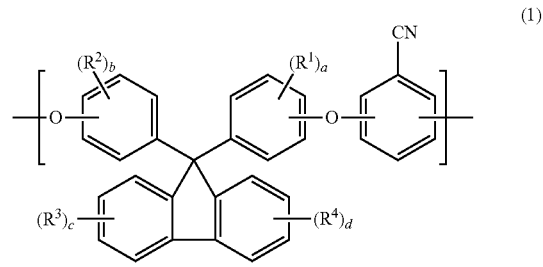

In formula (1), $R^1$ to $R^4$ are each independently a monovalent organic group having from 1 to 12 carbons; and "a" to "d" are each independently an integer from 0 to 4.

[Chem. 2]

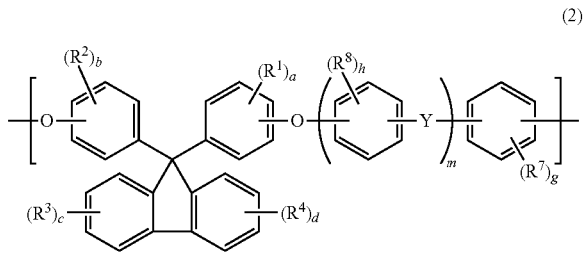

In formula (2), $R^1$ to $R^4$ and "a" to "d" are each independently synonymous with $R^1$ to $R^4$ and "a" to "d" in formula (1); Y is a single bond, $-SO_2-$ or $>C=O$; $R^7$ and $R^8$ are each independently a halogen atom, a monovalent organic group having from 1 to 12 carbons or a nitro group; "g" and "h" are each independently an integer from 0 to 4; and "m" is 0 or 1; provided that when "m" is 0, $R^7$ is not a cyano group.

[3] The optical filter described in [1] or [2], wherein the aromatic polyether-based polymer further comprises at least one structural unit (ii) selected from the group consisting of a structural unit represented by formula (3) below and a structural unit represented by formula (4) below.

[Chem. 3]

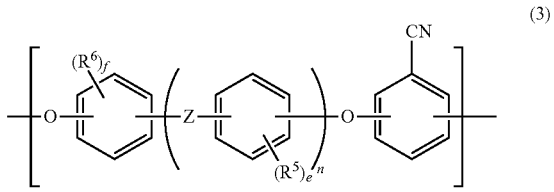

(3)

In formula (3), $R^5$ and $R^6$ are each independently a monovalent organic group having from 1 to 12 carbons; Z is a single bond, —O—, —S—, —SO$_2$—, >C=O, —CONH—, —COO— or a divalent organic group having from 1 to 12 carbons; "e" and "f" are each independently an integer from 0 to 4; and "n" is 0 or 1.

[Chem. 4]

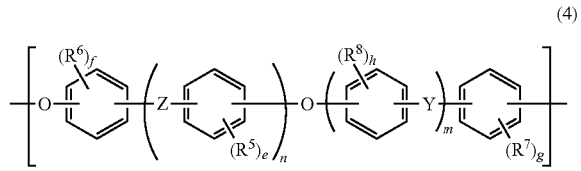

(4)

In formula (4), $R^7$, $R^8$, Y, "m", "g" and "h" are each independently synonymous with $R^7$, $R^8$, Y, "m", "g" and "h" of formula (2); and $R^5$, $R^6$, Z, "n", "e" and "f" are each independently synonymous with $R^5$, $R^6$, Z, "n", "e" and "f" of formula (3).

[4] The optical filter described in [3], wherein a molar ratio of the structural unit (i) to the structural unit (ii) in the aromatic polyether-based polymer is from 50:50 to 100:0.

[5] The optical filter described in any one of [1] to [4], wherein weight average molecular weight determined by gel permeation chromatography (GPC) relative to polystyrene of the aromatic polyether-based polymer is from 5,000 to 500,000.

[6] The optical filter described in any one of [1] to [5], wherein when the substrate has a thickness of 30 μm, a total light transmittance, determined by a transparency testing method specified in JIS K7105 is not less than 85%.

[7] The optical filter described in any one of [1] to [6], wherein when the substrate has a thickness of 30 μm, a YI (yellow index) value is not greater than 3.0.

[8] The optical filter described in any one of [1] to [7], wherein when the substrate has a thickness of 30 μm, retardation (Rth) in a thickness direction is not greater than 200 nm.

[9] An imaging device comprising the optical filter described in any one of [1] to [8].

Advantageous Effects of Invention

The optical filter of the present invention has superior light transmittance, heat resistance, heat coloration resistance, and mechanical strength, and has little retardation in the thickness direction. As a result, the optical filter of the present invention can be suitably used in imaging devices.

DESCRIPTION OF EMBODIMENTS

Optical filter

An optical filter of the present invention comprises a substrate and a dielectric multilayer film formed on at least one surface of the substrate. The substrate comprises an aromatic polyether-based polymer having a glass transition temperature (Tg), measured via differential scanning calorimetry (DSC, heating rate: 20° C./min), of from 230 to 350° C.

The optical filter of the present invention has superior light transmittance, heat resistance, heat coloration resistance and mechanical strength, and has little retardation in the thickness direction. As a result, the optical filter of the present invention can be suitably used in imaging devices.

Additionally, in the optical filter of the present invention, even when absorbing particularly intense light, damage and deterioration of optical properties, caused by temperature increases of the filter due to the absorption of such light, are low.

In the present invention, "heat coloration resistance" refers to coloration resistant when exposed to elevated temperatures and, for example, refers to resistance to coloration when heat treated for about one hour at an elevated temperature (230° C.) in air.

<Substrate>
Aromatic Polyether Polymer

A glass transition temperature of the aromatic polyether-based polymer is preferably from 240 to 330° C. and more preferably is from 250 to 300° C.

The substrate comprising such an aromatic polyether-based polymer has superior, well-balanced light transmittance, heat resistance, heat coloration resistance and mechanical strength and, therefore, can be suitably used in an optical filter. Additionally, an optical filter with superior optical properties can be obtained because heating or heat treating performed when forming the dielectric multilayer film on the at least one surface of the substrate can be carried out at an elevated temperature.

The aromatic polyether-based polymer is a polymer obtained by reaction that results in the formation of ether bonds on the main chain, and preferably comprises at least one structural unit (i) selected from the group consisting of a structural unit represented by formula (1) below (hereinafter referred to as "structural unit (1)") and a structural unit represented by formula (2) below (hereinafter referred to as "structural unit (2)"). Because the polymer comprises the structural unit (i), an aromatic polyether having a glass transition temperature of from 230 to 350° C. can be obtained. The substrate comprising such a polymer maintains colorless transparency at the time of manufacture of the optical filter and under conditions of use over an extended period of time.

[Chem. 5]

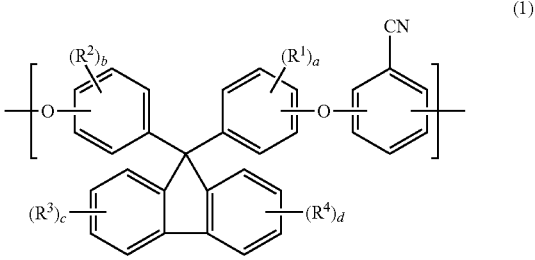

(1)

In formula (1), $R^1$ to $R^4$ are each independently a monovalent organic group having from 1 to 12 carbons; and "a" to "d" are each independently an integer from 0 to 4, preferably 0 or 1, and more preferably 0.

Examples of the monovalent organic group having from 1 to 12 carbons include a monovalent hydrocarbon group having from 1 to 12 carbons, and a monovalent organic group having from 1 to 12 carbons and containing at least one kind of atom selected from the group consisting of an oxygen atom and a nitrogen atom.

Examples of the monovalent hydrocarbon group having from 1 to 12 carbons include a linear or branched hydrocarbon group having from 1 to 12 carbons, an alicyclic hydrocarbon group having from 3 to 12 carbons and an aromatic hydrocarbon group having from 6 to 12 carbons.

The linear or branched hydrocarbon group having from 1 to 12 carbons is preferably a linear or branched hydrocarbon group having from 1 to 8 carbons, and more preferably a linear or branched hydrocarbon group having from 1 to 5 carbons.

Specific preferable examples of the linear or branched hydrocarbon group include methyl groups, ethyl groups, n-propyl groups, isopropyl groups, n-butyl groups, sec-butyl groups, tert-butyl groups, n-pentyl groups, n-hexyl groups, and n-heptyl groups.

The alicyclic hydrocarbon group having from 3 to 12 carbons is preferably an alicyclic hydrocarbon group having from 3 to 8 carbons, and more preferably an alicyclic hydrocarbon group having from 3 or 4 carbons.

Specific preferable examples of the alicyclic hydrocarbon group having from 3 to 12 carbons include cycloalkyl groups such as a cyclopropyl group, a cyclobutyl group, a cyclopentyl group and a cyclohexyl group; and cycloalkenyl groups such as a cyclobutenyl group, a cyclopentenyl group and a cyclohexenyl group. A binding site of the alicyclic hydrocarbon group may be at any carbon on the alicyclic ring.

Examples of the aromatic hydrocarbon group having from 6 to 12 carbons include phenyl groups, biphenyl groups, and naphthyl groups. A binding site of the aromatic hydrocarbon group may be at any carbon on the aromatic ring.

Examples of the organic group having from 1 to 12 carbons and containing an oxygen atom include an organic group having a hydrogen atom, a carbon atom and an oxygen atom. Among these, preferable examples include an organic group having from 1 to 12 carbons in total and containing a hydrocarbon group and an ether bond, a carbonyl group or an ester bond.

Examples of the organic group having from 1 to 12 carbons in total and containing an ether bond include an alkoxy group having from 1 to 12 carbons, an alkenyloxy group having from 2 to 12 carbons, an alkynyloxy group having from 2 to 12 carbons, an aryloxy group having from 6 to 12 carbons, and an alkoxyalkyl group having from 2 to 12 carbons. Specific examples thereof include methoxy groups, ethoxy groups, propoxy groups, isopropyloxy groups, butoxy groups, phenoxy groups, propenyloxy groups, cyclohexyloxy groups, methoxy methyl groups, and the like.

Examples of the organic group having from 1 to 12 carbons in total and containing a carbonyl group include an acyl group having from 2 to 12 carbons. Specific examples thereof include acetyl groups, propionyl groups, isopropionyl groups, and benzoyl groups.

Examples of the organic group having from 1 to 12 carbons in total and containing an ester group include an acyloxy group having from 2 to 12 carbons. Specific examples thereof include acetyloxy groups, propionyloxy groups, isopropionyloxy groups, and benzoyloxy groups.

Examples of the organic group having from 1 to 12 carbons and containing a nitrogen atom include an organic group containing a hydrogen atom, a carbon atom and a nitrogen atom. Specific examples thereof include cyano groups, imidazole groups, triazole groups, benzimidazole groups, and benzotriazole groups.

Examples of the organic group having from 1 to 12 carbons and containing an oxygen atom and a nitrogen atom include an organic group containing a hydrogen atom, a carbon atom, an oxygen atom, and a nitrogen atom. Specific examples thereof include oxazole groups, oxadiazole groups, benzoxazole groups, and benzoxadiazole groups.

The $R^1$ to $R^4$ in formula (1) are preferably monovalent hydrocarbon groups having from 1 to 12 carbons, more preferably aromatic hydrocarbon groups having from 6 to 12 carbons; and even more preferably phenyl groups.

[Chem. 6]

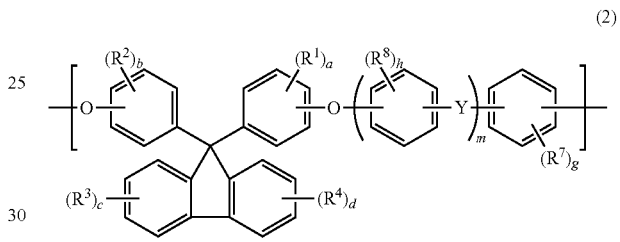

(2)

In formula (2), $R^1$ to $R^4$ and "a" to "d" are each independently synonymous with $R^1$ to $R^4$ and "a" to "d" in formula (1); Y is a single bond, —$SO_2$— or >C=O; $R^7$ and $R^8$ are each independently a halogen atom, a monovalent organic group having from 1 to 12 carbons or a nitro group; and "m" is 0 or 1; provided that when "m" is 0, $R^7$ is not a cyano group. "g" and "h" are each independently an integer from 0 to 4, preferably 0.

Examples of the monovalent organic group having from 1 to 12 carbons include organic groups synonymous with the monovalent organic group having from 1 to 12 carbons in formula (1), and the like.

From the perspectives of optical properties, heat resistance and mechanical properties, a molar ratio of the structural unit (1) to the structural unit (2) of the polymer (provided that the sum of both structural units (structural unit (1)+structural unit (2)) is 100) is preferably such that structural unit (1):structural unit (2)=50:50 to 100:0, more preferably such that structural unit (1):structural unit (2)=70:30 to 100:0, and even more preferably such that structural unit (1): structural unit (2)=80:20 to 100:0.

As used herein, "mechanical properties" refer to properties of the polymer, such as tensile strength, elongation at break and tensile modulus of elasticity.

Additionally, the polymer may further comprise at least one structural unit (ii) selected from the group consisting of a structural unit represented by formula (3) below and a structural unit represented by formula (4) below. The polymer preferably comprises this structural unit (ii) because a substrate comprising such a polymer has improved mechanical properties.

[Chem. 7]

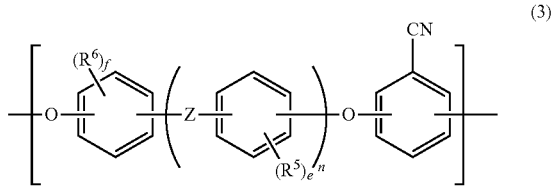

(3)

In formula (3), $R^5$ and $R^6$ are each independently a monovalent organic group having from 1 to 12 carbons; Z is a single bond, —O—, —S—, —SO$_2$—, >C=O, —CONH—, —COO— or a divalent organic group having from 1 to 12 carbons; and "n" is 0 or 1. "e" and "f" are each independently an integer from 0 to 4, preferably 0.

Examples of the monovalent organic group having from 1 to 12 carbons include organic groups synonymous with the monovalent organic group having from 1 to 12 carbons in formula (1), and the like.

Examples of the divalent organic group having from 1 to 12 carbons include a divalent hydrocarbon group having from 1 to 12 carbons, a divalent halogenated hydrocarbon group having from 1 to 12 carbons, a divalent organic group having from 1 to 12 carbons and containing at least one kind of atom selected from the group consisting of an oxygen atom and a nitrogen atom, and a divalent halogenated organic group having from 1 to 12 carbons and containing at least one kind of atom selected from the group consisting of an oxygen atom and a nitrogen atom.

Examples of the divalent hydrocarbon group having from 1 to 12 carbons include a linear or branched divalent hydrocarbon group having from 1 to 12 carbons, a divalent alicyclic hydrocarbon group having from 3 to 12 carbons and a divalent aromatic hydrocarbon group having from 6 to 12 carbons.

Examples of the linear or branched divalent hydrocarbon group having from 1 to 12 carbons include methylene groups, ethylene groups, trimethylene groups, isopropylidene groups, pentamethylene groups, hexamethylene groups and heptamethylene groups.

Examples of the divalent alicyclic hydrocarbon group having from 3 to 12 carbons include cycloalkylene groups such as a cyclopropylene group, a cyclobutylene group, a cyclopentylene group, and a cyclohexylene group; and cycloalkenylene groups such as a cyclobutenylene group, a cyclopentenylene group and a cyclohexenylene group. A binding site of the alicyclic hydrocarbon group may be at any carbon on the alicyclic ring.

Examples of the divalent aromatic hydrocarbon group having from 6 to 12 carbons include phenylene groups, naphthylene groups and biphenylene groups. A binding site of the aromatic hydrocarbon group may be at any carbon on the aromatic ring.

Examples of the divalent halogenated hydrocarbon group having from 1 to 12 carbons include a linear or branched divalent halogenated hydrocarbon group having from 1 to 12 carbons, a divalent halogenated alicyclic hydrocarbon group having from 3 to 12 carbons and a divalent halogenated aromatic hydrocarbon group having from 6 to 12 carbons.

Examples of the linear or branched divalent halogenated hydrocarbon group having from 1 to 12 carbons include difluoromethylene groups, dichloromethylene groups, tetrafluoroethylene groups, tetrachloroethylene groups, hexafluorotrimethylene groups, hexachlorotrimethylene groups, hexafluoroisopropylidene groups and hexachloroisopropylidene groups.

Examples of the divalent halogenated alicyclic hydrocarbon group having from 3 to 12 carbons include a group obtained by substituting at least one hydrogen atom of a group exemplified in the divalent alicyclic hydrocarbon group having from 3 to 12 carbons with a fluorine atom, a chlorine atom, a bromine atom or an iodine atom.

Examples of the divalent halogenated aromatic hydrocarbon group having from 6 to 12 carbons include a group obtained by substituting at least one hydrogen atom of a group recited as an example for the divalent aromatic hydrocarbon group having from 6 to 12 carbons with a fluorine atom, a chlorine atom, a bromine atom or an iodine atom.

Examples of the organic group having from 1 to 12 carbons and containing at least one kind of atom selected from the group consisting of an oxygen atom and a nitrogen atom include an organic group containing a hydrogen atom, a carbon atom, an oxygen atom and/or a nitrogen atom. Examples thereof include a divalent organic group having from 1 to 12 carbons in total and containing a hydrocarbon group and an ether bond, a carbonyl group, an ester bond or an amide bond.

Examples of the divalent halogenated organic group having from 1 to 12 carbons and containing at least one kind of atom selected from the group consisting of an oxygen atom and a nitrogen atom include a group obtained by substituting at least one hydrogen atom of a group recited as an example for the divalent organic group having from 1 to 12 carbons and containing at least one kind of atom selected from the group consisting of an oxygen atom and a nitrogen atom with a fluorine atom, a chlorine atom, a bromine atom or an iodine atom.

Z in formula (3) is preferably a single bond, —O—, —SO$_2$—, >C=O or a divalent organic group having from 1 to 12 carbons; and more preferably a divalent hydrocarbon group having from 1 to 12 carbons or a divalent halogenated hydrocarbon group having from 1 to 12 carbons. The divalent hydrocarbon group having from 1 to 12 carbons is preferably a linear or branched divalent hydrocarbon group having from 1 to 12 carbons or a divalent alicyclic hydrocarbon group having from 3 to 12 carbons.

[Chem. 8]

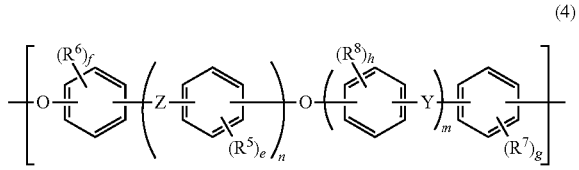

(4)

In formula (4), $R^7$, $R^8$, Y, "m", "g" and "h" are each independently defined in the same manner as described for $R^7$, $R^8$, Y, "m", "g" and "h" of the formula (2); and $R^5$, $R^6$, Z, "n", "e" and "f" are each independently defined in the same manner as described for $R^5$, $R^6$, Z, "n", "e" and "f" of the formula (3). Note that when "m" is 0, $R^7$ is not a cyano group.

From the perspectives of optical properties, heat resistance and mechanical properties, a molar ratio of the structural unit (i) to the structural unit (ii) of the polymer (provided that the sum of the structural units (i)+(ii) is 100) is preferably such that (i):(ii)=50:50 to 100:0, more preferably such that (i):(ii)= 70:30 to 100:0, and even more preferably such that (i):(ii)= 80:20 to 100:0.

From the perspectives of optical properties, heat resistance and mechanical properties, in the polymer, the structural unit (i) and the structural unit (ii) preferably constitute not less than 70 mol % of all the structural units, and more preferably constitute not less than 95 mol % of all the structural units.

Process for Synthesizing the Polymer

The polymer can be obtained, for example, by reacting a component (A) comprising at least one compound selected from the group consisting of a compound represented by formula (5) below (hereinafter referred to as "compound (5)") and a compound represented by formula (7) below (hereinafter referred to as "compound (7)"), and a component (B) comprising a compound represented by formula (6) below.

[Chem. 9]

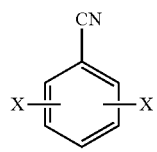

(5)

In formula (5), X are each independently a halogen atom, preferably a fluorine atom.

[Chem. 10]

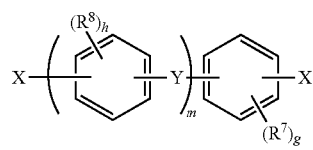

(7)

In formula (7), $R^7$, $R^8$, Y, "m", "g" and "h" are each independently synonymous with $R^7$, $R^8$, Y, "m", "g", and "h" of formula (2); and X are each independently synonymous with X of the formula (5). Provided that when "m" is 0, $R^7$ is not a cyano group.

[Chem. 11]

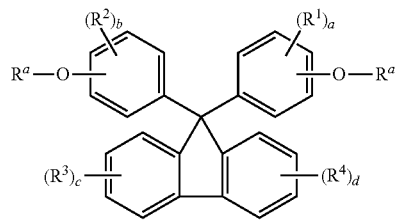

(6)

In formula (6), $R^a$ are each independently a hydrogen atom, a methyl group, an ethyl group, an acetyl group, a methanesulfonyl group or a trifluoromethylsulfonyl group. Among these, a hydrogen atom is preferred. In formula (6), $R^1$ to $R^4$ and "a" to "d" are each independently synonymous with $R^1$ to $R^4$ and "a" to "d" in formula (1).

Specific examples of the compound (5) include 2,6-difluorobenzonitrile, 2,5-difluorobenzonitrile, 2,4-difluorobenzonitrile, 2,6-dichlorobenzonitrile, 2,5-dichlorobenzonitrile, 2,4-dichlorobenzonitrile, and reactive derivatives thereof. In particular, from the perspectives of reactivity, cost performance, and the like, 2,6-difluorobenzonitrile and 2,6-dichlorobenzonitrile are preferably used. Combinations of two or more types of these compounds can be used.

Specific examples of the compound represented by formula (6) (hereinafter referred to as "compound (6)") include 9,9-bis(4-hydroxyphenyl)fluorene, 9,9-bis(3-phenyl-4-hydroxyphenyl)fluorene, 9,9-bis(3,5-diphenyl-4-hydroxyphenyl)fluorene, 9,9-bis(4-hydroxy-3-methylphenyl)fluorene, 9,9-bis(4-hydroxy-3,5-dimethylphenyl)fluorene, 9,9-bis(4-hydroxy-3-cyclohexylphenyl)fluorene, and reactive derivatives thereof. Of these compounds, 9,9-bis(4-hydroxyphenyl)fluorene and 9,9-bis(3-phenyl-4-hydroxyphenyl)fluorene can be preferably used. Combinations of two or more types of these compounds can be used.

Specific examples of the compound (7) include 4,4'-difluorobenzophenone, 4,4'-difluorodiphenylsulphone, 2,4'-difluorobenzophenone, 2,4'-difluorodiphenylsulphone, 2,2'-difluorobenzophenone, 2,2'-difluorodiphenylsulphone, 3,3'-dinitro-4,4'-difluorobenzophenone, 3,3'-dinitro-4,4'-difluorodiphenylsulphone, 4,4'-dichlorobenzophenone, 4,4'-dichlorodiphenylsulphone, 2,4'-dichlorobenzophenone, 2,4'-dichlorodiphenylsulphone, 2,2'-dichlorobenzophenone, 2,2'-dichlorodiphenylsulphone, 3,3'-dinitro-4,4'-dichlorobenzophenone, 3,3'-dinitro-4,4'-dichlorodiphenylsulphone, and the like. Of these, 4,4'-difluorobenzophenone and 4,4'-difluorodiphenylsulphone are preferable. Combinations of two or more types of these compounds can be used.

100 mol % of the component (A) preferably contains from 80 mol % to 100 mol % and more preferably from 90 mol % to 100 mol % of the at least one compound selected from the group consisting of the compound (5) and the compound (7).

As necessary, the component (B) preferably comprises a compound represented by formula (8) below.

100 mol % of the component (B) preferably contains from 50 mol % to 100 mol %, more preferably from 80 mol % to 100 mol %, and even more preferably from 90 mol % to 100 mol % of the compound (6).

[Chem. 12]

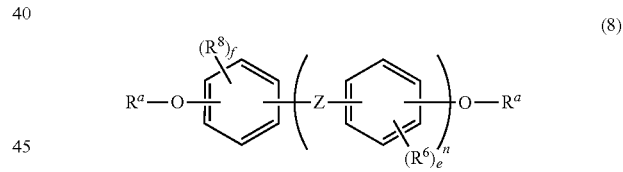

(8)

In formula (8), $R^5$, $R^6$, Z, "n", "e" and "f" are each independently synonymous with $R^5$, $R^6$, Z, "n", "e" and "f" in formula (3); and $R^a$ is independently synonymous with $R^a$ in formula (6).

Examples of the compound represented by formula (8) include hydroquinone, resorcinol, 2-phenyl hydroquinone, 4,4'-biphenol, 3,3'-biphenol, 4,4'-dihydroxydiphenylsulphone, 3,3'-dihydroxydiphenylsulphone, 4,4'-dihydroxybenzophenone, 3,3'-dihydroxybenzophenone, 2,2-bis(4-hydroxyphenyl)propane, 1,1-bis(4-hydroxyphenyl)cyclohexane, 2,2-bis(4-hydroxyphenyl)-1,1,1,3,3,3-hexafluoropropane, and reactive derivatives thereof. Combinations of two or more types of these compounds can be used.

Of the compounds described above, resorcinol, 4,4'-biphenol, 2,2-bis(4-hydroxyphenyl)propane, 1,1-bis(4-hydroxyphenyl)cyclohexane, and 2,2-bis(4-hydroxyphenyl)-1,1,1,3,3,3-hexafluoropropane are preferable and, from the perspectives of reactivity and mechanical properties, 4,4'-biphenol is particularly preferable. Combinations of two or more types of these compounds can be used.

More specifically, the polymer can be synthesized via method (I'), described below.

Method (I'): React the component (B) with an alkali metal compound in an organic solvent in order to obtain an alkali metal salt of the component (B); then, react the obtained alkali metal salt with the component (A). By reacting the component (B) with the alkali metal compound in the presence of the component (A), the alkali metal salt of the component (B) may be reacted with the component (A).

Examples of the alkali metal compound for use in the reaction include an alkali metal such as lithium, potassium and sodium; an alkali metal hydride such as lithium hydride, potassium hydride and sodium hydride; an alkali metal hydroxide such as lithium hydroxide, potassium hydroxide and sodium hydroxide; an alkali metal carbonate such as lithium carbonate, potassium carbonate and sodium carbonate; and an alkali metal hydrogen carbonate such as lithium hydrogen carbonate, potassium hydrogen carbonate and sodium hydrogen carbonate. A single alkali metal compound or a combination of two or more alkali metal compounds may be used.

The alkali metal compound is used in an amount such that the amount of metal atoms in the alkali metal compound, with respect to all —O—$R^a$ in the component (B), is typically from 1 to 3 times by equivalents, preferably from 1.1 to 2 times by equivalents, and more preferably from 1.2 to 1.5 times by equivalents.

Examples of the organic solvent for use in the reaction include N,N-dimethylacetamide, N,N-dimethylformamide, N-methyl-2-pyrrolidone, 1,3-dimethyl-2-imidazolidinone, γ-butyllactone, sulfolane, dimethylsulfoxide, diethylsulfoxide, dimethylsulfone, diethylsulfone, diisopropylsulfone, diphenylsulfone, diphenylether, benzophenone, dialkoxybenzene (the number of carbons of the alkoxy group: 1 to 4) and trialkoxybenzene (the number of carbons of the alkoxy group: 1 to 4). Among these solvents, particularly preferred are polar organic solvents having high dielectric constant such as N-methyl-2-pyrrolidone, N,N-dimethylacetamide, sulfolane, diphenylsulfone and dimethylsulfoxide. A single organic solvent or a combination of two or more organic solvents may be used.

Furthermore, a solvent azeotropic with water, such as benzene, toluene, xylene, hexane, cyclohexane, octane, chlorobenzene, dioxane, tetrahydrofuran, anisole and phenetole can be used in the reaction. A single solvent azeotropic with water or a combination of two or more solvents azeotropic with water may be used.

Usage ratios of the component (A) and the component (B) when the total of the component (A) and the component (B) equals 100 mol % are preferably such that the component (A) is used in an amount of not less than 45 mol % and not more than 55 mol %, more preferably not less than 50 mol % and not more than 52 mol % and even more preferably more than 50 mol % and not more than 52 mol %; and preferably such that the component (B) is used in an amount of not less than 45 mol % and not more than 55 mol %, more preferably not less than 48 mol % and not more than 50 mol %, and even more preferably not less than 48 mol % and less than 50 mol %.

The reaction temperature is preferably in a range from 60 to 250° C. and more preferably from 80 to 200° C. The reaction time is preferably in a range from 15 minutes to 100 hours and more preferably from 1 hour to 24 hours.

Physical Properties and the Like of the Polymer

The polymer preferably has a weight average molecular weight (Mw) in terms of polystyrene, as measured using a HLC-8220 GPC apparatus manufactured by Tosoh Corporation (column: TSK gel α-M; developing solvent: tetrahydrofuran (hereinafter, also referred to as "THF")), of from 5,000 to 500,000, more preferably from 15,000 to 400,000, and even more preferably from 30,000 to 300,000.

The polymer preferably has a pyrolysis temperature, as measured using thermogravimetric analysis (TGA), of not less than 450° C., more preferably not less than 475° C., and even more preferably not less than 490° C.

Manufacturing Method of the Substrate

A manufacturing method of the substrate is not particularly limited. Examples thereof include a method of forming the substrate on a support in which a polymer composition comprising the polymer is applied on a support in order to form a coating film and, thereafter, an organic solvent is removed from the coating film.

By forming the substrate according to such a method, orientation of the molecules of the polymer in a uniform direction can be avoided and, as a result, a substrate with even lower retardation can be obtained.

A mixture of the polymer and the organic solvent obtained via the method (I') can be used as-is as the polymer composition. The substrate can be produced easily and inexpensively by using such a polymer composition.

Additionally, the polymer composition can be prepared by separating (refining) the polymer as a solid component from the mixture of the polymer and the organic solvent obtained via the method (I') and, thereafter, re-dissolving the polymer in the organic solvent.

The isolation (purification) of the polymer as the solid component can be carried out, for example, by reprecipitating the polymer in a poor polymer solvent such as methanol, filtering, and then drying a cake under reduced pressure.

Suitable examples of the organic solvent for dissolving the polymer include methylene chloride, tetrahydrofuran, cyclohexanone, N,N-dimethylformamide, N,N-dimethylacetamide, N-methylpyrrolidone and γ-butyrolactone. In terms of coatability and economical viewpoint, more preferred are methylene chloride, N,N-dimethylacetamide and N-methylpyrrolidone. A single solvent may be used, or a combination of two or more solvents may be used.

The polymer concentration in the polymer composition in which the polymer has been dissolved is dependent on the molecular weight of the polymer, but is typically from 5 to 40% by mass and is preferably from 7 to 25% by mass. When the concentration of the polymer in the polymer composition is within the range described above, the formation of a thick film is possible, pinholes can hardly occur, and a substrate with excellent surface smoothness can be formed.

The viscosity of the polymer composition is dependent on the molecular weight and the concentration of the polymer, but is typically from 2,000 to 100,000 mPa·s and is preferably from 3,000 to 50,000 mPa·s. When the viscosity of the polymer composition is within the range described above, retentivity of the composition during film formation is excellent, and film thickness is easily controlled, which leads to easy formation of a substrate.

The polymer composition can further comprise an anti-aging agent. Durability of the obtained substrate can be enhanced as a result of comprising the anti-aging agent.

A preferable example of the anti-aging agent is a hindered phenol-type compound.

Examples of the hindered phenol-type compound that can be used in the present invention include
triethyleneglycol-bis[3-(3-tert-butyl-5-methyl-4-hydroxypheny 1)propionate],
1,6-hexanediol-bis[3-(3,5-di-tert-butyl-4-hydroxyphenyl) propionate], 2,4-bis-(n-octylthio)-6-(4-hydroxy-3,5-di-tert-butylanilino)-3,5-triazine,
pentaerythritoltetrakis[3-(3,5-tert-butyl-4-hydroxyphenyl)propionate],
1,1,3-tris[2-methyl-4-[3-(3,5-di-tert-butyl-4-hydroxyphenyl)propionyloxy]-5-tert-butylphenyl]butane,
2,2-thio-diethylenebis[3-(3,5-di-tert-butyl-4-hydroxyphenyl)propionate],
octadecyl-3-(3,5-di-tert-butyl-4-hydroxyphenyl)propionate,
N,N-hexamethylenebis(3,5-di-tert-butyl-4-hydroxy-hydrocinnamamide),
1,3,5-trimethyl-2,4,6-tris(3,5-di-tert-butyl-4-hydroxybenzyl)benzene,
tris-(3,5-di-tert-butyl-4-hydroxybenzyl)-isocyanurate,
3,9-bis[2-[3-(3-tert-butyl-4-hydroxy-5-methylphenyl)propionyl oxy]-1,1-dimethylethyl]-2,4,8,10-tetraoxaspiro[5.5]undecane, and the like.

In cases where the anti-aging agent is compounded in the polymer composition, a compounded amount of the anti-aging agent is preferably from 0.01 to 10 parts by weight per 100 parts by weight of the polymer.

Examples of methods for forming the coating film by applying the polymer composition on a support include roll coating, gravure coating, spin coating, and methods using a doctor blade.

The thickness of the coating film is not particularly limited but, for example, is from 1 to 250 μm, and preferably is from 2 to 150 μm, and more preferably is from 5 to 125 μm.

Examples of the support include polyethylene terephthalate (PET) films, SUS plates, and the like.

The method for removing the organic solvent from the coating film is not particularly limited, and examples thereof include a method of heating the coating film.

The heating conditions can be arbitrarily determined depending on the support and the polymer, provided that the organic solvent can be removed from the coating film. For example, the heating temperature is preferably from 30 to 300° C., more preferably from 40 to 250° C., and even more preferably from 50 to 230° C. The heating time is preferably from 10 minutes to 5 hours.

The heating may be carried out in two or more stages. A specific method includes drying at a temperature of from 30° C. to 80° C. for from 10 minutes to 2 hours, and then heating at a temperature of from 100° C. to 250° C. for from 10 minutes to 2 hours. As needed, drying may be carried out under a nitrogen atmosphere or under reduced pressure.

Additionally, when manufacturing the substrate, after removing the organic solvent from the coating film, the solvent-free coating film is preferably calcinated. By including a calcinating step when manufacturing the substrate, a substrate with low thermal shrinkage can be produced. As a result, the dielectric multilayer film can be easily formed on the substrate.

When calcinating, the coating film formed on the support may be calcinated together with the support but, from the standpoint that the properties of the support does not be affected, the coating film formed on the support is preferably delaminated from the support and, thereafter calcinated. The process for removing the organic solvent from the coating film may be carried out by calcinating the coating film or, alternately a separate step of removing the organic solvent prior to the calcinating step may be included. A step of removing the organic solvent from the coating film prior to delaminating the coating film from the support is preferably included when calcinating the coating film that has been delaminated from the support.

The calcinating step is preferably carried out at a specific temperature. The calcinating temperature is preferably from 210° C. to 350° C., more preferably from 220° C. to 330° C., and even more preferably from 230° C. to 320° C. Calcinating time is preferably from 10 minutes to 5 hours.

The calcinating atmosphere is not particularly limited, but the calcinating is preferably carried out under normal atmospheric conditions or under an atmosphere containing an inert gas, or the like; and more preferably is carried out under an atmosphere containing an inert gas.

From the perspective of coloration, examples of the inert gas include nitrogen, argon, helium, and the like, of which nitrogen is preferable.

The obtained substrate can be delaminated from the support and used or, alternatively, depending on the type of support used and the application of the composite, can be used as-is without delaminating.

Thickness of the substrate may be appropriately selected depending on the application thereof, but is preferably from 1 to 250 μm, more preferably from 2 to 150 μm, and even more preferably from 10 to 125 μm.

Taking the retardation of the substrate, weight reduction of the imaging device, and the like into consideration, the thickness of the substrate is preferably low.

Physical Properties and the Like of the Substrate

The substrate preferably has a glass transition temperature (Tg) of 230 to 350° C., more preferably 240 to 330° C., and still more preferably 250 to 300° C. The glass transition temperature (Tg) is determined from a measurement taken at a heating rate of 20° C./min using a model 8230 DSC measuring apparatus, manufactured by Rigaku Corporation.

If the substrate has such a glass transition temperature, an optical filter with particularly superior optical properties can be easily manufactured because heating or heat treating performed when forming the dielectric multilayer film on the at least one surface of the substrate can be carried out at an elevated temperature.

When the thickness of the substrate is 30 μm, the film preferably has a total light transmittance in accordance with JIS K7105 transparency testing methods of not less than 85% and more preferably not less than 88%. The total light transmittance is measurable using a haze meter, SC-3H, manufactured by Suga Test Instruments Co., Ltd.

When the thickness of the substrate is 30 μm, light transmittance at a wavelength of 400 nm is preferably not less than 70%, more preferably not less than 75%, and even more preferably not less than 80%. The light transmittance at a wavelength of 400 nm can be measured using an ultraviolet-visible spectrophotometer V-570 (manufactured by JASCO Inc.).

When the light transmittance of the substrate is within the range described above, the substrate is particularly high light transmittance and can be suitably used in an optical filter.

When the thickness of the substrate is 30 μm, a YI (yellow index) value is preferably not greater than 3.0, more preferably not greater than 2.5, and even more preferably not greater than 2.0. The YI value can be measured using an SM-T colorimeter, manufactured by Suga Test Instruments Co., Ltd. A substrate that is not prone to coloration can be obtained and suitably used in an optical filter when the YI value is within this range.

When the thickness of the substrate is 30 μm, a YI value after heating for one hour at 230° C. in air using a hot air dryer (YI value after heating) is preferably not greater than 3.0, more preferably not greater than 2.5, and even more preferably not greater than 2.0. A substrate that is not prone to coloration under elevated temperatures can be obtained and an optical filter having superior optical properties can be obtained when the YI value is within this range.

The substrate has a refractive index with respect to 633 nm wavelength light of preferably from 1.55 to 1.75 and more preferably from 1.60 to 1.70. The refractive index can be measured using a prism coupler model 2010 (manufactured by Metricon Corp.).

Tensile strength of the substrate is preferably from 50 to 200 MPa and more preferably from 80 to 150 MPa. The tensile strength can be measured using a tensile tester 5543 (manufactured by Instron).

Breaking elongation of the substrate is preferably from 5 to 100% and more preferably from 15 to 100%. The breaking elongation can be measured using a tensile tester 5543 (manufactured by Instron).

A tensile modulus of elasticity of the substrate is preferably from 2.5 to 4.0 GPa and more preferably from 2.7 to 3.7 GPa. The tensile modulus of elasticity can be measured using a tensile tester 5543 (manufactured by Instron).

When the thickness of the substrate is 30 μm, the retardation (Rth) in the thickness direction is preferably not greater than 200 nm, more preferably not greater than 50 nm, and even more preferably not greater than 10 nm. The retardation can be measured using a RETS spectroscope, manufactured by Otsuka Electronics Co., Ltd.

When the retardation of the substrate is low as described above, the substrate has superior optical isotropy. In cases where the optical filter comprising the substrate is used in an imaging device, declines in the performance of the imaging device due to the appearance of coloration and fringe pattern on the display surface can be suitably prevented. As a result, the optical filter of the present invention can be suitably used in imaging devices.

A coefficient of linear expansion of the substrate, measured using a SSC-5200 TMA measuring device (manufactured by Seiko Instruments), is preferably not more than 80 ppm/K and more preferably not more than 75 ppm/K.

A coefficient of humidity expansion of the substrate is preferably not greater than 15 ppm/% RH and more preferably not greater than 12 ppm/% RH. The coefficient of humidity expansion can be measured using the humidity control option of a TMA device (TMA-SS6100, manufactured by SII Nano Technology Inc.). When the coefficient of expansion of the substrate is within the range described above, the substrate has high dimensional stability (environmental reliability) and, as a result, the substrate can be more suitably used as an optical filter.

Substrate Comprising a Near-infrared Ray Absorbent

In cases where the optical filter of the present invention is used as a near-infrared ray cutoff filter, the substrate preferably comprises a near-infrared ray absorbent. Such a substrate comprising a near-infrared ray absorbent can, for example, be manufactured according to the same method used to manufacture the substrate with the exception of using a composition in which a near-infrared ray absorbent is compounded in the polymer composition.

Examples of the near-infrared ray absorbent include compounds that have an absorption maximum ($\lambda_{max}$) in the wavelength of from 600 to 800 nm.

Examples of such near-infrared ray absorbents include cyanin-based dyes, phthalocyanine-based dyes, aminium-based dyes, iminium-based coloring matters, azo-based coloring matters, anthraquinone-based coloring matters, diimonium-based coloring matters, squarylium-based coloring matters, and porphyrin-based coloring matters.

With the substrate comprising the near-infrared ray absorbent having an absorption maximum in the specific wavelength region, angular dependence of incident light is small and near-infrared absorption wavelengths on the short wavelength (visible light) side can be stably determined. Thus, compared with a conventional near-infrared ray cutoff filter formed using only a dielectric multilayer film (described hereinafter), in which near-infrared absorption wavelengths on the short wavelength (visible light) side change depending on the angle of incident light, a near-infrared cutoff filter in which changes in transparent characteristics with respect to change the angle of incidence are small can be obtained.

Specific commercially available examples of such near-infrared ray absorbents include Lumogen IR765 and Lumogen IR788 (manufactured by BASF); ABS643, ABS654, ABS667, ABS670T, ABS694, IRA693N, and IRA735 (manufactured by Exciton); SDA3598, SDA6075, SDA8030, SDA8303, SDA8470, SDA3039, SDA3040, SDA3922, and SDA7257 (manufactured by H.W. SANDS); TAP-15 and IR-706 (manufactured by Yamada Chemical Co., Ltd.); and the like.

A single near-infrared ray absorbent may be used alone or a combination of two or more near-infrared ray absorbents may be used.

In the present invention, a usage amount of the near-infrared ray absorbent may be selected arbitrarily based on the desired characteristics, but is typically from 0.01 to 10.0 wt %, preferably from 0.01 to 8.0 wt %, and more preferably from 0.01 to 5.0 wt % per 100 wt % of the polymer comprised in the substrate.

When the usage amount of the near-infrared ray absorbent is within this range, dependence on the angle of incidence of the absorbed wavelength is small, and a near-infrared ray cutoff filter having superior near-infrared ray cutoff power, superior transmission in the range of from 450 to 600 nm, and superior strength can be obtained.

If the usage amount of the near-infrared ray absorbent exceeds the range described above, a near-infrared ray cutoff filter that has more characteristics of near-infrared ray absorbents may be obtained. However, there is a possibility that the transmission in the range of from 450 to 600 nm declines below the desired value and there is also a possibility that the strength of the substrate and/or the near-infrared ray cutoff filter is lower. If the usage amount of the near-infrared ray absorbent is below the range described above, a near-infrared ray cutoff filter that indicates high transmission in the range of from 450 to 600 nm may be obtained. However, expression of characteristics of the near-infrared ray absorbent may be poor, and it may be difficult to obtain a near-infrared ray cutoff filter with a small dependence on the angle of incidence of the absorbed wavelength.

Preferable values of the glass transition temperature, YI value, YI value after heating, tensile strength, breaking elongation, tensile modulus of elasticity, coefficient of linear expansion and coefficient of humidity expansion of the substrate comprising the near-infrared ray absorbent are synonymous with preferable values of the glass transition temperature, YI value, YI value after heating, tensile strength, breaking elongation, tensile modulus of elasticity, coefficient of linear expansion and coefficient of humidity expansion of the substrate recited in the "Physical properties and the like of the substrate" section above.

Note that, depending on the near-infrared ray absorbent used, the substrate comprising the near-infrared ray absorbent may be colored. Thus, the YI value of the substrate comprising the near-infrared ray absorbent may be a negative value. It is preferable that optical articles such as optical filters and the like do not take on a yellow tinge. Therefore, the substrate comprising the near-infrared ray absorbent can still be suitably used as a substrate for an optical filter even if the YI value is a negative value.

Substrate Comprising a Pigment and/or a Dye

In cases where the optical filter of the present invention is used as a neutral density filter, the substrate preferably comprises a pigment and/or a dye. Such a substrate comprising a pigment and/or a dye can, for example, be manufactured according to the same method used to manufacture the substrate with the exception of using a composition in which a pigment and/or a dye is compounded in the polymer composition.

The pigment is not particularly limited, but is preferably a pigment having absorption in the visible light region and, moreover, having uniform light absorption in the visible light region (displays a flattened spectral transmission curve in the visible light range). The pigment is more preferably at least one type of inorganic particle selected from the group consisting of a metal, a carbon black, a metal oxide, a metal nitride, and a metal nitride oxide. The inorganic particle is more preferably an inorganic ultrafine particle.

A usage amount of the pigment is preferably from 0.01 to 5 wt % and more preferably from about 0.05 to 3 wt % per 100 wt % of the polymer comprised in the substrate.

It is preferable that the compounded amount of the pigment comprised in the substrate is within this range because light is appropriately absorbed in the visible light region, and a neutral density filter having a desired optical density can be easily manufactured.

Example of the metals, metal oxides, metal nitrides, and metal nitride oxides having absorption in the visible light region include metals, oxides, nitrides, and nitride oxides of any type of elemental metal, but metals, oxides, nitrides, and nitride oxides of elemental metals belonging to groups 3 to 11 of the 4th period of the periodic table of elements are preferable. Elements of groups 3 to 11 of the 4th period of the periodic table include scandium (Sc), titanium (Ti), vanadium (V), chromium (Cr), manganese (Mn), iron (Fe), cobalt (Co), nickel (Ni), and copper (Cu). Of these, Ti, Mn, Fe, and Cu are preferable.

The metal oxide is more preferably a complex oxide formed from two or more metals and, particularly, a metal complex oxide formed from copper, iron and manganese is preferable. A composition ratio of the metal complex oxide formed from copper, iron and manganese is not particularly limited, but when the metal complex oxide formed from copper, iron and manganese is 100 wt %, the metal complex oxide preferably has a composition: such that from 5 to 30 wt % of a copper oxide, from 25 to 70 wt % of an iron oxide, and from 25 to 70 wt % of a manganese oxide.

A spectral transmission curve in the visible light region of the metal complex oxide formed from copper, iron and manganese at the composition ratio described above has flatness. Therefore, the metal complex oxide is preferable because a neutral density filter using the metal complex oxide displays a flattened spectral transmission curve in the visible light region.

A primary particle size of the inorganic particles is preferably from 5 to 100 nm and more preferably from 20 to 70 nm. When the primary particle size is within this range, scattered light which may occur by using the neutral density filter can be suppressed. This is preferable because, as a result, declines in resolution, ghosting of images, and flares which may occur by using the neutral density filter can be prevented.

In the present invention, the pigment in the substrate may be in a form where primary particles are dispersed therein as-is; in a form where added primary particles agglomerate and are dispersed therein as secondary, tertiary, or higher order agglomerated particles; or in a form where a mixture including both primary particles and secondary or higher order agglomerated particles is dispersed therein. In any of these cases, an average particle size of the particles in the substrate is preferably from about 50 to 600 nm, more preferably from about 50 to 400 nm, and even more preferably from about 50 to 200 nm. It is preferable that a pigment having such an average particle size is used because the haze value of a neutral density filter can be reduced.

The dye is not particularly limited, provided that it is a dye that has absorption in the visible light region.

In cases where a dye formed from organic matter is used, the dye has absorption at a specific wavelength based on the chemical structure of the organic matter. Therefore, in the present invention, in cases where the spectral transmission curve of the neutral density filter cannot be flattened by compounding the specific pigment in the substrate alone, it is possible to flatten the spectral transmission curve of the neutral density filter by compounding a specific dye having absorption in a wavelength region near the maximum value of the spectral transmission curve along with the pigment in the substrate.

Examples of the dye having absorption in the visible light region include phthalocyanine-based, thiol metal complex-based, azo-based, polymethine-based, diphenylmethane-based, triphenylmethane-based, quinone-based, anthoraquinone-based, and diimonium salt-based, and similar coloring matter compounds.

In the present invention, preferable commercially available products that are examples of the dye having absorption in the visible light region include SDA4137, SDA4428, SDA9800, SDA9811, and SDB3535 (all manufactured by Sands Corporation); the KAYASORB series, and the Kayaset series (both manufactured by Nippon Kayaku Co., Ltd.).

Preferable values of the glass transition temperature, YI value, YI value after heating, tensile strength, breaking elongation, tensile modulus of elasticity, coefficient of linear expansion and coefficient of humidity expansion of the substrate comprising the pigment and/or the dye are synonymous with preferable values of the glass transition temperature, YI value, YI value after heating, tensile strength, breaking elongation, tensile modulus of elasticity, coefficient of linear expansion and coefficient of humidity expansion of the substrate recited in the "Physical properties and the like of the substrate" section above.

<Dielectric Multilayer Film>

The dielectric multilayer film can be produced via a conventionally known method.

Specifically, a multilayer film obtained by alternately laminating a high refractive index material layer and a low refractive index material layer can be suitably used as the dielectric multilayer film.

A material having a refractive index of not less than 1.7 can be used as the material constituting the high refractive index material layer and, typically, a material having a refractive index range from 1.7 to 2.5 is selected.

Examples of such a material include materials comprising titanium oxide, zirconium oxide, tantalum pentoxide, niobium pentoxide, lanthanum oxide, yttrium oxide, zinc oxide, zinc sulfide or indium oxide as a main component, and a small amount of titanium oxide, tin oxide, and/or cerium oxide, etc.

A material having a refractive index of not greater than 1.6 can be used as the material constituting the low refractive index material layer and, typically, a material having a refractive index range from 1.2 to 1.6 is selected.

Examples of such a material include silica, alumina, lanthanum fluoride, magnesium fluoride, sodium aluminum hexafluoride, and the like.

The method for forming the dielectric multilayer film on at least one surface of the substrate is not particularly limited. Examples thereof include forming a dielectric multilayer film in which the high refractive index material layer and the low refractive index material layer are alternately laminated via a CVD process, a sputtering process, a vacuum deposition process, or the like; the obtained dielectric multilayer film is adhered to the substrate using an adhesive, or the high refractive index material layer and the low refractive index material layer are directly alternately laminated on the substrate via a CVD process, a sputtering process, a vacuum deposition process, or the like.

Among these, from the perspectives of the uniformity of the obtained dielectric multilayer film and adhesion of the multilayer film to the substrate, the film is preferably directly formed on the substrate via a sputtering process.

A temperature when forming the high refractive index material layer and the low refractive index material layer via a sputtering process or the like is dependent on the material used, but is preferably from 150 to 350° C., more preferably from 180 to 300° C., and even more preferably from 220 to 260° C.

The dielectric multilayer film is preferably formed on the substrate at such an elevated temperature. An optical filter that is not prone to cracking even after being exposed to elevated temperatures can be obtained by forming the dielectric multilayer film at the elevated temperature.

The process of forming the dielectric multilayer film on the substrate is typically carried out at an elevated temperature of not less than 200° C. Therefore, specifically, because elastic modulus variation of the substrate measured by a dynamic viscoelasticity measurement (manufactured by Viveron), can occur at Tg minus 20 to 30° C., in order to withstand this elevated temperature, it is typically necessary for the polymer included in the substrate that is used to have a high Tg (measured with a DSC) of not less than 20° C. higher than the heating temperature.

The substrate forming the member must be heat resistant to at least 230° C. and is preferably heat resistant from 230 to 350° C., more preferably from 240 to 330° C., and even more preferably from 250 to 300° C. Thus, the glass transition temperature of the polymer included in the substrate also is preferably within this range.

The polymer can be suitably used as the material of the substrate on which the dielectric multilayer film is formed because the Tg of the polymer is within this range.

The temperature range in which the film is formable is wide even in cases where the dielectric multilayer film is formed directly on the substrate because the substrate has superior heat resistance. As a result, the dielectric multilayer film can be easily formed on the substrate without degradation of the characteristics of the dielectric multilayer film.

Thicknesses of each layer of the high refractive index material layer and the low refractive index material layer are typically from $0.1\lambda$ to $0.5\lambda$ of the infrared wavelength $\lambda$ (nm) intended to be blocked. When the thicknesses are within the range described above, the product (n×d) of the refractive index (n) and the film thickness (d) is about equivalent to the optical film thickness calculated by the formula $\lambda/4$, and the relationship between reflection and refraction optical properties can be maintained. As a result, blocking and transmittance of specific wavelengths will tend to be easily controllable.

The number of the laminated layers of each of the high refractive index material layer and the low refractive index material layer is preferably from 5 to 50 layers and more preferably from 10 to 45 layers.

Furthermore, in cases where warping of the substrate occurs when depositing the dielectric multilayer film, in order to resolve such warping, for example, the dielectric multilayer film may be deposited on both surfaces of the substrate, or a process can be carried out in which the surface of the substrate on which the dielectric multilayer film is deposited is subjected to irradiation with radiation such as ultraviolet light. In cases where irradiating radiation, the irradiation may be carried out while forming the dielectric multilayer film or the irradiation may be carried out separately after forming the dielectric multilayer film.

<Optical Filter>

The optical filter of the present invention has superior optical properties and heat coloration resistance. Thus, the optical filter of the present invention is useful as a near-infrared ray cutoff filter used primarily for a CCD or CMOS of a camera module, or a similar solid-state image sensor for luminosity factor correction or, alternatively, as a neutral density (ND) filter used primarily to adjust the quantity of light for preventing declines in resolution.

The optical filter of the present invention is particularly useful in digital still cameras, mobile phone cameras, digital video cameras, PC cameras, monitoring cameras, vehicle cameras, personal digital assistants, personal computers, video games, medical devices, USB memory, portable gaming devices, fingerprint recognition systems, digital music players, toy robots, toys, and the like. Furthermore, the optical filter of the present invention is useful as a heat wave cutting filter for application to vehicle or building glass, or the like.

Mounting of a camera module on a main support can be completely automated because the optical filter of the present invention has heat resistance that is particularly suitable for reflow soldering. Thus, especially from the characteristics described above, the optical filter is expected to have significant benefits in quality, cost and design as an optical filter for a camera module.

The optical filter may be heated when used (integrated) in imaging devices or the like. The optical filter particularly preferably has heat resistance suitable for reflow soldering. Thus, the optical filter is preferable in that changes of the dielectric multilayer film such as cracking of the dielectric multilayer film formed on the substrate do not occur even after exposure to elevated temperatures (e.g. after heating for 10 minutes at 250° C.)

The optical filter of the present invention comprises the substrate with the superior heat resistance, heat coloration resistance, and the like and, therefore, the temperature when forming the dielectric multilayer film on the substrate can be an elevated temperature. As a result, the optical filter of the present invention is a filter with superior heat stability by which cracking does not easily occur even after being exposed to elevated temperatures.

As necessary, the optical filter of the present invention may be provided with an antireflection layer. The antireflection layer is not particularly limited provided that it prevents or reduces reflection of visible light at the interface between the substrate and the air and/or the interface between the dielectric multilayer film and the air. The antireflection layer is preferably formed on the surface of the substrate opposite the surface on which the dielectric multilayer film is laminated.

The antireflection layer can, for example, be formed by laminating from 1 to 4 layers of the high refractive index material and the low refractive index material, described above for the dielectric multilayer film, via a CVD process, a sputtering process, a vacuum deposition process, or the like.

Additionally, examples of methods for forming the antireflection layer include a method in which the antireflection layer is formed on a surface of the substrate via an imprinting process using heat; or a process in which the antireflection layer is formed on a surface of the substrate by performing wet coating using a sol-gel material (or the like) comprising an alkoxy titanium compound or an alkoxysilane compound as raw materials as the high refractive index material or the low refractive index material, respectively.

The sol-gel materials are typically cured using heat, but the antireflection layer may also be formed by using energy rays (e.g. ultraviolet light or the like) to generate an acid (condensation catalyst) or the like to cure or, in other words, by photocuring (see JP-A-2000-109560 and JP-A-2000-1648).

Among these, from the perspective that the materials and equipment used when forming the dielectric multilayer film can be used as-is, a method in which the antireflection layer is formed via the same method used to form the dielectric multilayer film is preferable. Alternatively, from the perspective of increasing productivity, a method in which the antireflection layer is formed by wet coating, as described above, is preferable.

Imaging Device

The imaging device of the present invention includes the optical filter of the present invention described above.

The optical filter of the present invention has superior optical properties, superior and well-balanced heat resistance, heat coloration resistance and mechanical strength, and, furthermore, is lightweight and has superior resistance to impact shock. Therefore, a lightweight and low profile imaging device having superior performance can be obtained.

Examples of the imaging device of the present invention include digital still cameras, mobile phone cameras, digital video cameras, PC cameras, monitoring cameras, vehicle cameras, and the like.

EXAMPLES

Hereinafter, the present invention is specifically described with reference to Examples.

(1) Structural Analysis

The structural analysis of polymers obtained in the following Examples and Comparative Examples was carried out by IR (ATR method, FT-IR, 6700, manufactured by NICOLET) and by NMR (ADVANCE500, manufactured by Brukar Corporation).

(2) Weight Average Molecular Weight (Mw), Number-average Molecular Weight (Mw), and Molecular Weight Distribution (Mw/Mn)

The weight average molecular weight (Mw), number-average molecular weight (Mw), and molecular weight distribution (Mw/Mn) of the polymers obtained in the following Examples and Comparative Examples was measured using a HLC-8220 GPC apparatus manufactured by Tosoh Corporation (column: TSK gel α-M; developing solvent: THF).

(3) Glass Transition Temperature (Tg)

The glass transition temperatures of the polymers and the evaluation films obtained in the following Examples and Comparative Examples were measured at a heating rate of 20° C./min using a 8230 DSC measuring apparatus manufactured by Rigaku Corporation.

(3') Pyrolysis Temperature

The pyrolysis temperature of the polymers obtained in the following Examples and Comparative Examples was measured via thermogravimetric analysis (TGA; carried out in a nitrogen atmosphere, heating rate: 10° C./min., 5% weight loss temperature).

(4) Mechanical Strength

The tensile strength, breaking elongation, and tensile modulus of elasticity at room temperature of the evaluation films obtained in the following Examples and Comparative Examples were measured using a tensile tester 5543 (manufactured by INSTRON Inc.) in accordance with JIS K7127.

(5) Environmental Stability

The coefficient of linear expansion of the evaluation films obtained in the following Examples and Comparative Examples was measured using a SSC-5200 TMA measurement device (manufactured by Seiko Instruments Inc.). After increasing the temperature from room temperature to 280° C., the coefficient of linear expansion was calculated from the slope between 200 to 100° C. when lowering the temperature at a rate of 3° C./min.

The coefficient of humidity expansion of the evaluation films obtained in the following Examples and Comparative Examples was measured under the following conditions using thermal mechanical analysis (TMA; TMA-SS6100, manufactured by SII Nano Technology Inc.) with humidity control option.

Humidity conditions: Humidity changed every 10% RH from 40% RH to 70% RH (stretching method: added 5 g load); temperature: 23° C.

(6) Optical Properties

The total light transmittance and YI value of the evaluation films obtained in the following Examples and Comparative Examples were measured in accordance with JIS K7105 transparency testing methods. Specifically, the total light transmittance of the evaluation films was measured using a haze meter (SC-3H, manufactured by Suga Test Instruments Co., Ltd.) and the YI value (YI before heating) of the evaluation films was measured using a SM-T colorimeter (manufactured by Suga Test Instruments Co., Ltd.).

YI value after heating the evaluation films obtained in the following Examples and Comparative Examples with a hot air drier under atmosphere at 230° C. for 1 hour was measured using a color meter, SM-T, manufactured by Suga Test Instruments Co., Ltd. (YI after heating).

The light transmittance of the evaluation films obtained in the following Examples and Comparative Examples at a wavelength of 400 nm was measured using a UV·visible light spectrophotometer (V-570, manufactured by JASCO Corporation), and the refractive index of the obtained evaluation films was measured using a prism coupler model 2010 (manufactured by Metricon Corp.).

The retardation (Rth) of the evaluation films obtained in the following Examples and Comparative Examples was measured using a RETS spectroscope (manufactured by Otsuka Electronics Co., Ltd.). The base wavelength when measuring was 589 nm, and the evaluated film thickness of the retardation was a standardized value of 30 μm.

(7) Evaluation of the Optical Filter

The evaluation films obtained in the following Examples were cut to 10 cm×10 cm squares. A multi-layer deposition film that reflects near-infrared light was formed at a vapor deposition temperature of 150° C. on one side of the obtained film [silica ($SiO_2$: film thickness of from 120 to 190 nm) layers and titania ($TiO_2$: film thickness of from 70 to 120 nm) layers alternately laminated; number of layers: 50]. Next, optical filters were manufactured by irradiating the surface of the substrate on which the multi-layer deposition film was laminated with 1 $J/cm^2$ UV light under a nitrogen atmosphere using a metal halide lamp provided with a cold mirror. Spectral transmission curves of these optical filters were determined using a spectrophotometer (U-3140, manufactured by Hitachi, Ltd.).

Cases in which transmittance of the obtained optical filter was 5% or less in the near-infrared light region (wavelengths from 750 to 1000 nm) were indicated as the "○" symbol.

The evaluation results of the optical filters are shown in Table 1.

(8) Evaluation of Crack Resistance of the Optical Filter

The evaluation films obtained in the following Examples and Comparative Examples were cut to 10 cm×10 cm squares. A multi-layer deposition film that reflects near-infrared light was formed at a vapor deposition temperature of 200° C. on both sides of the obtained film [silica ($SiO_2$: film thickness of from 120 to 190 nm) layers and titania ($TiO_2$: film thickness of from 70 to 120 nm) layers alternately laminated; number of layers: 50].

Thus, optical filters were manufactured. The obtained optical filters were heated in an oven for 10 minutes at 250° C. and were visually evaluated for cracking in the deposition film before and after the heating. Cases in which cracks were not seen were indicated as the "○" symbol.

The evaluation results of the optical filters are shown in Table 1.

Example 1

35.12 g (0.253 mol) of 2,6-difluorobenzonitrile (hereinafter also referred to as "DFBN"), component (A); 70.08 g (0.200 mol) of 9,9-bis(4-hydroxyphenyl)fluorene (hereinafter also referred to as "BPFL") and 5.51 g (0.050 mol) of resorcinol (hereinafter also referred to as "RES"), component (B); 41.46 g (0.300 mol) of potassium carbonate; 443 g of N,N-dimethyl acetamide (hereinafter also referred to as "DMAc"); and 111 g of toluene were added to a 3 L four-neck flask. Then, a thermometer, a stirrer, a three-way cock with a nitrogen introducing tube, a Dean-Stark tube, and a cooling tube were attached to the four-neck flask.

Next, the flask was purged with nitrogen and, thereafter, the resultant solution was reacted for 3 hours at 140° C. The generated water was constantly removed via the Dean-Stark tube. The temperature was raised gradually to 160° C. after the generation of water ceased and the solution was reacted at this temperature for 6 hours.

After the solution was cooled to room temperature (25° C.), generated salt was removed using filter paper. The filtrate was poured into methanol in order to reprecipitate. The solution was subjected to filtration to isolate cake (residue). The resultant cake was vacuum dried at 60° C. overnight. Thus, a white powder (polymer; yield weight: 95.67 g, yield: 95%) was obtained.

Properties of the obtained polymer are shown in Table 1. The resultant polymer was subjected to structural analysis and weight average molecular weight measurement. The results of such measurements were that the characteristic absorption of the infrared absorption spectrum was at 3035 $cm^{-1}$ (C—H stretching), 2229 $cm^{-1}$ (CN), 1574 $cm^{-1}$, 1499 $cm^{-1}$ (aromatic ring skelton absorption), and 1240 $cm^{-1}$ (—O—); and the weight average molecular weight was 130,000.

Subsequently, the resultant polymer was redissolved in DMAc to obtain a polymer composition having a polymer concentration of 20% by mass. The polymer composition was applied using a doctor blade on a support composed of polyethylene terephthalate (PET), and was dried at 70° C. for 30 minutes and then dried at 100° C. for 30 minutes. Thus, a film was formed. Then, the film was delaminated from the PET support. Thereafter, the film was fixed to a metal frame and further calcinated for 2 hours at 230° C. Thus, an evaluation film having a thickness of 30 μm was obtained.

Properties of the obtained evaluation film are shown in Table 1.

Example 2

Other than using 11.41 g (0.050 mol) of 2,2-bis(4-hydroxyphenyl)propane instead of the 5.51 g of RES, Example 2 was carried out the same as Example 1. Properties of the obtained polymer and evaluation film are shown in Table 1.

Example 3

Other than using 78.84 g (0.225 mol) of BPFL and 8.41 g (0.025 mol) of 2,2-bis(4-hydroxyphenyl)-1,1,1,3,3,3-hexafluoropropane instead of 70.08 g of BPFL and 5.51 g of RES as the component (B), Example 3 was carried out the same as Example 1. Properties of the obtained polymer and evaluation film are shown in Table 1.

Example 4

Other than using 125.65 g (0.250 mol) of 9,9-bis(3-phenyl-4-hydroxyphenyl)fluorene instead of 70.08 g of BPFL and 5.51 g of RES as the component (B), Example 4 was carried out the same as Example 1. Properties of the obtained polymer and evaluation film are shown in Table 1.

Example 5

Other than using 87.60 g (0.250 mol) of BPFL instead of 70.08 g of BPFL and 5.51 g of RES as the component (B), Example 5 was carried out the same as Example 1. Properties of the obtained polymer and evaluation film are shown in Table 1.

Example 6

Other than using 78.84 g (0.225 mol) of BPFL and 6.71 g (0.025 mol) of 1,1-bis(4-hydroxyphenyl)cyclohexane instead of 70.08 g of BPFL and 5.51 g of RES as the component (B), Example 6 was carried out the same as Example 1. Properties of the obtained polymer and evaluation film are shown in Table 1.

Example 7

Other than using 28.10 g (0.202 mol) of DFBN and 11.02 g (0.051 mol) of 4,4-difluorobenzophenone instead of 35.12 g of DFBN as the component (A), Example 7 was carried out the same as Example 5. Properties of the obtained polymer and evaluation film are shown in Table 1.

Example 8

Other than changing the compounded amounts of the component (A) to 17.56 g (0.126 mol) of DFBN and 27.55 g (0.126 mol) of 4,4-difluorobenzophenone, Example 8 was carried out the same as Example 7. Properties of the obtained polymer and evaluation film are shown in Table 1.

Example 9

Other than using 63.56 g (0.250 mol) of 4,4-difluorodiphenylsulphone (DFDS) instead of 35.12 g of DFBN as the component (A), Example 9 was carried out the same as Example 5. Physical properties of the obtained polymers and evaluation film are shown in Table 1.

Example 10

Other than re-dissolving the obtained polymer in DMAc and then adding 0.1 parts by weight of a near-infrared absorbent ABS670T per 100 parts by weight of the polymer to the obtained solution when preparing a polymer composition having a polymer concentration of 20% by mass, Example 10 was carried out the same as Example 5. Properties of the obtained polymer and evaluation film are shown in Table 1.

Example 11

Other than re-dissolving the obtained polymer in DMAc and then adding 0.1 parts by weight of a near-infrared absorbent ABS694T per 100 parts by weight of the polymer to the obtained solution when preparing a polymer composition having a polymer concentration of 20% by mass, Example 11 was carried out the same as Example 5. Properties of the obtained polymer and evaluation film are shown in Table 1.

Comparative Example 1

Other than using 84.06 g (0.250 mol) of 2,2-bis(4-hydroxyphenyl)-1,1,1,3,3,3-hexafluoropropane instead of 70.08 g of BPFL and 5.51 g of RES as the component (B), Comparative Example 1 was carried out the same as Example 1. Properties of the obtained polymer and evaluation film are shown in Table 1. Note that the evaluation of the optical filter could not be carried out because the film deformed or melted when forming the multi-layer deposition film.

Comparative Example 2

Polyethylene naphthalate film (Teonex, manufactured by Teijin Limited) was used and evaluated in the same manner as in Example 1 (film thickness: 125 μm). Properties of the film are shown in Table 1. Note that the evaluation of the optical filter could not be carried out because the film deformed or melted when forming the multi-layer deposition film.

Comparative Example 3

9.70 g (23.6 mmol) of 2,2-bis[4-(4-aminophenoxy)phenyl]propane was added to a 300 mL four-neck flask provided with a thermometer, a stirrer, a nitrogen introducing tube, and a cooling tube. Next, after purging the flask with nitrogen, 60 ml of N-methyl-2-pyrrolidone (NMP) was added and stirred until uniformly mixed. 5.30 g (23.6 mmol) of 2,3,5-tricarboxycyclopentyl acetic acid dianhydride was added at room temperature to the obtained solution. Stirring was continued to react the solution at this temperature for 12 hours. Thus, a solution comprising polyamic acid was obtained.

75 ml of NMP was added to and diluted in the obtained solution comprising polyamic acid. Then, 7.5 ml of pyridine and 6.7 ml of acetic anhydride were added and the solution was stirred for 6 hours at 110° C. and imidized. Then, the solution was cooled to room temperature. Thereafter, the obtained solution added to a large amount of methanol. The solution was subjected to filtration to isolate cake. The resultant cake was vacuum dried at 60° C. overnight. Thus, a white powder (polymer; yield weight: 13.5 g, yield: 95.3%) was obtained.

Subsequently, the resultant polymer was redissolved in DMAc to obtain a 20 mass % resin solution. The resin solution was applied using a doctor blade (100 μm gap) on a support composed of polyethylene terephthalate (PET), and was dried at 100° C. for 30 minutes and then dried again at 150° C. for 60 minutes. Thus, a film was formed. Then, the film was delaminated from the PET support. Thereafter, the film was further dried under reduced pressure for 3 hours at 150° C. Thus, an evaluation film having a thickness of 30 μm was obtained. Evaluation of this evaluation film was carried out in the same manner as in Example 1. The results are shown in Table 1.

TABLE 1

| | Pre-deposition evaluation | | | | | | | |
|---|---|---|---|---|---|---|---|---|
| | Basic Physical Properties | | | | | Mechanical strength | | |
| | | | | | | | | Tensile |
| | Mw [—] | Mn [—] | Mw/Mn [—] | Tg [° C.] | Pyrolysis temperature [° C.] | Tensile strength [Mpa] | Breaking elongation [%] | modulus of elasticity [Gpa] |
| Example 1 | 130,000 | — | — | 270 | 501 | 109 | 30 | 2.9 |
| Example 2 | 98,000 | 45,000 | 2.18 | 250 | 510 | 121 | 43 | 3 |
| Example 3 | 105,000 | 53,000 | 1.98 | 252 | 530 | 115 | 20 | 3.1 |
| Example 4 | 146,000 | 67,000 | 2.18 | 275 | 556 | 125 | 8 | 3.2 |
| Example 5 | 188,000 | 75,000 | 2.51 | 285 | 554 | 127 | 10 | 3.2 |
| Example 6 | 78,000 | 36,000 | 2.17 | 260 | 522 | 115 | 28 | 3.1 |
| Example 7 | 122,000 | — | — | 271 | 502 | 126 | 51 | 3.1 |
| Example 8 | 157,000 | 42,000 | 3.74 | 250 | 500 | 120 | 56 | 3.2 |
| Example 9 | 132,000 | 37,000 | 3.57 | 265 | 524 | 125 | 22 | 3 |
| Example 10 | 188,000 | 75,000 | 2.51 | 285 | 554 | 127 | 10 | 3.2 |
| Example 11 | 188,000 | 75,000 | 2.51 | 285 | 554 | 127 | 10 | 3.2 |
| Comparative Example 1 | 180,000 | 72,000 | 2.50 | 185 | 514 | 109 | 82 | 2.8 |
| Comparative Example 2 | — | — | — | 155 | — | No breaking | No breaking | 4.7 |
| Comparative Example 3 | 292,000 | — | — | 300 | 445 | 100 | 42 | 2.9 |

TABLE 1-continued

| | Pre-deposition evaluation | | | | | |
|---|---|---|---|---|---|---|
| | Environmental stability | | Optical properties | | | |
| | Coefficient of linear expansion [ppm/K] | Coefficient of humidity expansion [ppm/% RH] | Transmittance/ 400 nm [%] | Total light transmittance [%] | Refractive index [—] | Retardation [nm] |
| Example 1 | 63 | 10 | 85 | 88 | 1.64 | — |
| Example 2 | 57 | 8 | 88 | 89 | 1.60 | — |
| Example 3 | 58 | 8 | 85 | 88 | 1.65 | — |
| Example 4 | 71 | 6 | 86 | 88 | 1.70 | — |
| Example 5 | 60 | 6 | 85 | 88 | 1.66 | 2 |
| Example 6 | 65 | 6 | 85 | 88 | 1.66 | — |
| Example 7 | 58 | 7 | 86 | 88 | 1.64 | — |
| Example 8 | 55 | 7 | 86 | 88 | 1.65 | — |
| Example 9 | 56 | 6 | 86 | 88 | 1.70 | — |
| Example 10 | 60 | 6 | 82 | 83 | 1.66 | — |
| Example 11 | 60 | 6 | 75 | 84 | 1.66 | — |
| Comparative Example 1 | 63 | 7 | 88 | 92 | 1.56 | 250 |
| Comparative Example 2 | 20 | 10 | 76 | 87 | 1.66 | — |
| Comparative Example 3 | 60 | 99 | 85 | 89 | 1.60 | 94 |

| | Pre-deposition evaluation Appearance | | Post-deposition evaluation | |
|---|---|---|---|---|
| | YI before heating [—] | YI after heating [—] | Near-infrared transmittance [—] | Crack resistance [—] |
| Example 1 | 1.58 | 1.64 | ○ | ○ |
| Example 2 | 2.02 | 2.11 | ○ | ○ |
| Example 3 | 1.84 | 2.24 | ○ | ○ |
| Example 4 | 1.75 | 1.76 | ○ | ○ |
| Example 5 | 1.69 | 1.76 | ○ | ○ |
| Example 6 | 1.88 | 1.99 | ○ | ○ |
| Example 7 | 2.01 | 2.33 | ○ | ○ |
| Example 8 | 1.79 | 1.94 | ○ | ○ |
| Example 9 | 1.81 | 1.92 | ○ | ○ |
| Example 10 | −16.5 | −17.9 | ○ | ○ |
| Example 11 | −10.8 | −9.5 | ○ | ○ |
| Comparative Example 1 | 1.24 | Melted | — | Melted |
| Comparative Example 2 | 1.54 | Melted | — | Melted |
| Comparative Example 3 | 0.80 | 3.53 | — | ○ |

From the results shown above, it is clear that the film (substrate) has superior and well-balanced light transmittance, heat resistance, heat coloration resistance, and mechanical strength. Additionally, it is clear that the optical filter of the present invention has superior near-infrared light cutting performance. As a result, the optical filter of the present invention can be suitably used in imaging devices.

The invention claimed is:

1. An optical filter comprising a substrate and a dielectric multilayer film formed on at least one surface of the substrate, wherein the substrate comprises an aromatic polyether-based polymer having a glass transition temperature (Tg), measured via differential scanning calorimetry (DSC, heating rate: 20° C./min), of from 230 to 350° C., wherein the aromatic polyether-based polymer comprises at least one structural unit (i) selected from the group consisting of a structural unit represented by formula (1) and a structural unit represented by formula (2):

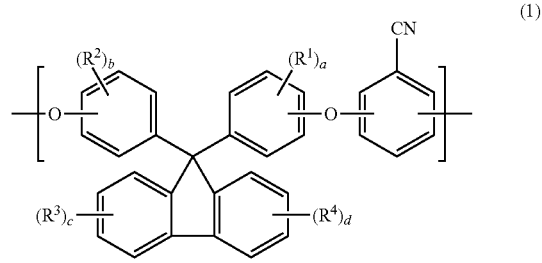

(1)

wherein $R^1$ to $R^4$ are each independently a monovalent organic group having from 1 to 12 carbons; and "a" to "d" are each independently an integer from 0 to 4; and

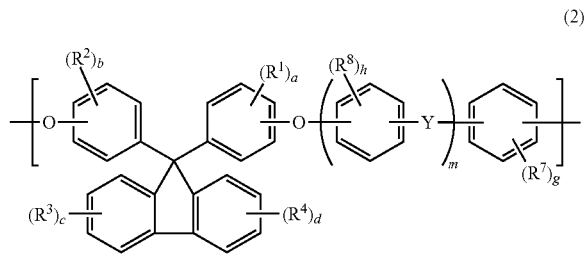
(2)

wherein $R^1$ to $R^4$ and "a" to "d" are each independently as defined in formula (1); Y is a single bond, —SO$_2$— or >C=O; $R^7$ and $R^8$ are each independently a monovalent organic group having from 1 to 12 carbons or a nitro group; "g" and "h" are each independently an integer from 0 to 4; and "m" is 0 or 1; provided that when "m" is 0, $R^7$ is not a cyano group.

2. The optical filter according to claim 1, wherein the aromatic polyether-based polymer further comprises at least one structural unit (ii) selected from the group consisting of a structural unit represented by formula (3) and a structural unit represented by formula (4):

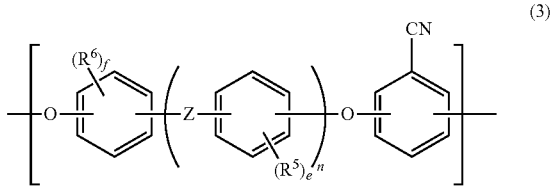
(3)

wherein, $R^5$ and $R^6$ are each independently a monovalent organic group having from 1 to 12 carbons; Z is a single bond, —O—, —S—, —SO$_2$—, >C=O, —CONH—, —COO— or a divalent organic group having from 1 to 12 carbons; "e" and "f" are each independently an integer from 0 to 4; and "n" is 0 or 1; and

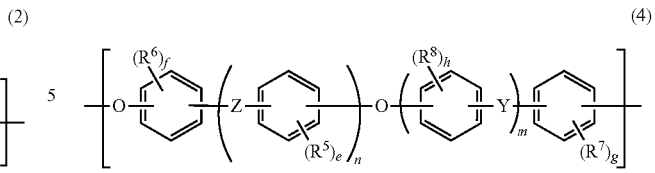
(4)

wherein, $R^7$, $R^8$, Y, "m", "g" and "h" are each independently as defined in formula (2); and $R^5$, $R^6$, Z, "n", "e" and "f" are each independently as defined in formula (3).

3. The optical filter according to claim 2, wherein a molar ratio of the structural unit (i) to the structural unit (ii) in the aromatic polyether-based polymer is from 50:50 to 100:0.

4. The optical filter according to claim 1, wherein weight average molecular weight determined by gel permeation chromatography (GPC) relative to polystyrene of the aromatic polyether-based polymer is from 5,000 to 500,000.

5. The optical filter according to claim 1, wherein, when the substrate has a thickness of 30 μm, a total light transmittance, determined by a transparency testing method specified in JIS K7105 is not less than 85%.

6. The optical filter according to claim 1, wherein, when the substrate has a thickness of 30 μm, a YI (yellow index) value is not greater than 3.0.

7. The optical filter according to claim 1, wherein, when the film has a thickness of 30 μm, retardation (Rth) in a thickness direction is not greater than 200 nm.

8. An imaging device comprising the optical filter described in claim 1.

9. The optical filter according to claim 1, wherein the substrate comprises a compound that has an absorption maximum in a wavelength of from 600 to 800 nm.

10. The optical filter according to claim 9, wherein the optical filter is a near-infrared ray cutoff filter.

11. The optical filter according to claim 1, wherein the optical filter is a neutral density filter.

* * * * *